US012065341B2

(12) United States Patent
Okamoto et al.

(10) Patent No.: US 12,065,341 B2
(45) Date of Patent: Aug. 20, 2024

(54) OPERATION ASSISTING APPARATUS FOR LOAD HANDLING VEHICLE

(71) Applicant: KABUSHIKI KAISHA TOYOTA JIDOSHOKKI, Kariya (JP)

(72) Inventors: Hironobu Okamoto, Aichi-ken (JP); Tomonori Kamiya, Aichi-ken (JP); Koji Hika, Aichi-ken (JP); Junji Inoue, Aichi-ken (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 325 days.

(21) Appl. No.: 17/770,762

(22) PCT Filed: Oct. 13, 2020

(86) PCT No.: PCT/JP2020/038676

§ 371 (c)(1),
(2) Date: Apr. 21, 2022

(87) PCT Pub. No.: WO2021/079790

PCT Pub. Date: Apr. 29, 2021

(65) Prior Publication Data

US 2022/0363528 A1 Nov. 17, 2022

(30) Foreign Application Priority Data

Oct. 25, 2019 (JP) ................................ 2019-194296

(51) Int. Cl.
*B66F 9/075* (2006.01)

(52) U.S. Cl.
CPC .......... *B66F 9/0755* (2013.01); *B66F 9/0759* (2013.01)

(58) Field of Classification Search
CPC .. B66F 9/0755; B66F 9/07581; B66F 9/0759; B66F 17/003; B66F 9/20; B66F 9/24; B66F 9/12; B60Y 2200/15; G05D 2201/0216
See application file for complete search history.

(56) References Cited

U.S. PATENT DOCUMENTS

2019/0345010 A1 11/2019 Shan et al.
2019/0360175 A1* 11/2019 Myers ....................... E02F 9/26
(Continued)

FOREIGN PATENT DOCUMENTS

EP 2653430 B1 3/2015
JP 05-054496 U 7/1993
(Continued)

OTHER PUBLICATIONS

Extended European Search Report dated Dec. 1, 2022 in EP Application No. 20879455.2.

*Primary Examiner* — Glenn F Myers
(74) *Attorney, Agent, or Firm* — Sughrue Mion, PLLC

(57) ABSTRACT

An operation assisting apparatus for a load handling vehicle conveying a load carried on a load handling apparatus includes a sensor, an object extraction unit configured to extract, as objects, a group of points representing parts of the objects from a result detected by the sensor in a coordinate system in a real space, a load handling space derivation unit configured to derive a load handling space occupied by the load during load handling work performed by the load handling apparatus in the coordinate system in the real space, a clearance derivation unit configured to derive a value of a clearance between the load handling space and an adjacent object adjacent to the load handling space, and an informing unit configured to inform an operator of the load handling vehicle of information about the value of the clearance.

4 Claims, 6 Drawing Sheets

(56) References Cited

U.S. PATENT DOCUMENTS

| | | | | |
|---|---|---|---|---|
| 2020/0026304 | A1* | 1/2020 | Thode .................. | G05D 1/0246 |
| 2020/0039353 | A1* | 2/2020 | Chandrasekar ....... | B66F 17/003 |

FOREIGN PATENT DOCUMENTS

| | | | |
|---|---|---|---|
| JP | 2011-037536 | A | 2/2011 |
| JP | 2011063358 | A | 3/2011 |
| JP | 2013-086959 | A | 5/2013 |
| WO | 2018119621 | A1 | 7/2018 |

* cited by examiner

OPERATION ASSISTING APPARATUS FOR LOAD HANDLING VEHICLE

CROSS REFERENCE TO RELATED APPLICATIONS

This application is a National Stage of International Application No. PCT/JP2020/038676 filed Oct. 13, 2020, claiming priority based on Japanese Patent Application No. 2019-194296 filed Oct. 25, 2019, the contents of all of which are incorporated herein by reference in their entirety.

TECHNICAL FIELD

The present disclosure relates to an operation assisting apparatus for a load handling vehicle.

BACKGROUND ART

A load handling vehicle conveys a load carried on a load handling apparatus of the load handling vehicle. One example of the operation assisting apparatuses for the load handling vehicle for assisting operations of the load handling vehicle by using an image displayed on a monitor is disclosed in Patent Literature 1. The operation assisting apparatus for the load handling vehicle disclosed in the Patent Literature 1 includes a camera, and a monitor on which an image captured by the camera is displayed. An operator of the load handling vehicle operates the load handling vehicle while observing the captured image displayed on the monitor.

CITATION LIST

Patent Literature

Patent Literature 1: Japanese Patent Application Publication No. 2011-37536

SUMMARY OF INVENTION

Technical Problem

During a load placing operation by the load handling vehicle, a load carried on the load handling apparatus is being placed at a load placing location. When an object is present in a vicinity of the load placing location, the operator of the load handling vehicle places the load at the load placing location so that the load does not contact the object, while checking the monitor for clearances between the load and the object. During a load picking up operation by the load handling vehicle, a load placed at a load picking up location is loaded on the load handling apparatus, and then the load handling vehicle is moved backward from the load picking up location. When an object is present in a vicinity of the load picking up location, the operator of the load handling vehicle moves the load handling vehicle backward so that the load does not contact the object, while checking the monitor for clearances between the load and the object. In this way, during the load placing operation and the load picking up operation by the load handling vehicle, the operator needs to check clearances between the load carried on the load handling apparatus and associated objects adjacent to the load. However, since the captured image displayed on the monitor is a two-dimensional image, some of the clearances between the load and the associated objects adjacent to the load may fail to be easily identified. In other words, the operator of the load handling vehicle may fail to determine whether or not the load contacts some of the objects adjacent to the load.

It is an objective of the present disclosure to provide an operation assisting apparatus for a load handling vehicle capable of assisting an operator of the load handling vehicle to easily determine whether or not a load contacts an adjacent object adjacent to the load.

Solution to Problem

An operation assisting apparatus for a load handling vehicle to solve the above problem is an operation assisting apparatus for a load handling vehicle that conveys a load carried on a load handling apparatus, including: a sensor; an object extraction unit configured to extract, as objects, a group of points representing parts of the objects from a result detected by the sensor in a coordinate system in a real space in which an axis extending in a width direction of the load handling vehicle among horizontal directions is an X-axis, an axis extending in an orthogonal direction to the X-axis among the horizontal directions is a Y-axis, and an axis extending in the vertical direction is a Z-axis; a load handling space derivation unit configured to derive a load handling space that is occupied by the load during load handling work performed by the load handling apparatus, in the coordinate system in the real space; a clearance derivation unit configured to derive a value of a clearance between the load handling space and an adjacent object adjacent to the load handling space, where the adjacent object is at least one of the objects adjacent to the load handling space in a direction along the X-axis and adjacent to the load handling space in a direction along the Z-axis, among the objects extracted by the object extraction unit; and an informing unit configured to inform an operator of the load handling vehicle of information about the value of the clearance.

Since the coordinate system in the real space is provided by three axes of the X-axis, the Y-axis, and the Z-axis that are orthogonal to one another, extracting the object in the coordinate system in the real space by the object extraction unit and deriving the load handling space in the coordinate system in the real space by the load handling space derivation unit permit deriving a positional relation between the load handling space and the object. The clearance derivation unit derives the value of the clearance between the load handling space and the adjacent object adjacent to the load handling space. The clearance between the load handling space and the adjacent object adjacent to the load handling space refers to the clearance between the load and the adjacent object adjacent to the load in the X-axis direction or the Z-axis direction. The informing unit informs the operator of the information about the value of the clearance derived by the clearance derivation unit. The information about the value of the clearance allows the operator to easily determine whether or not the load contacts the adjacent object adjacent to the load.

According to the above-described operation assisting apparatus for the load handling vehicle, the informing unit may be a monitor that is placed at a position visible from the operator of the load handling vehicle and on which a captured image captured by a camera installed in the load handling vehicle is displayed, and the operation assisting apparatus may include a display unit configured to display the information about the value of the clearance superposed on the captured image.

According to the above-described operation assisting apparatus for the load handling vehicle, the informing unit may inform the operator of whether or not the value of the clearance is less than a predetermined threshold value.

Advantageous Effects of Invention

The operation assisting apparatus for the load handling vehicle according to the present disclosure allows the operator of the load handling vehicle to easily determine whether or not the load contacts the adjacent object adjacent to the load.

DETAILED DESCRIPTION OF THE EMBODIMENTS

The following will describe an operation assisting apparatus for a load handling vehicle according to an embodiment of the present disclosure.

Figure 1:
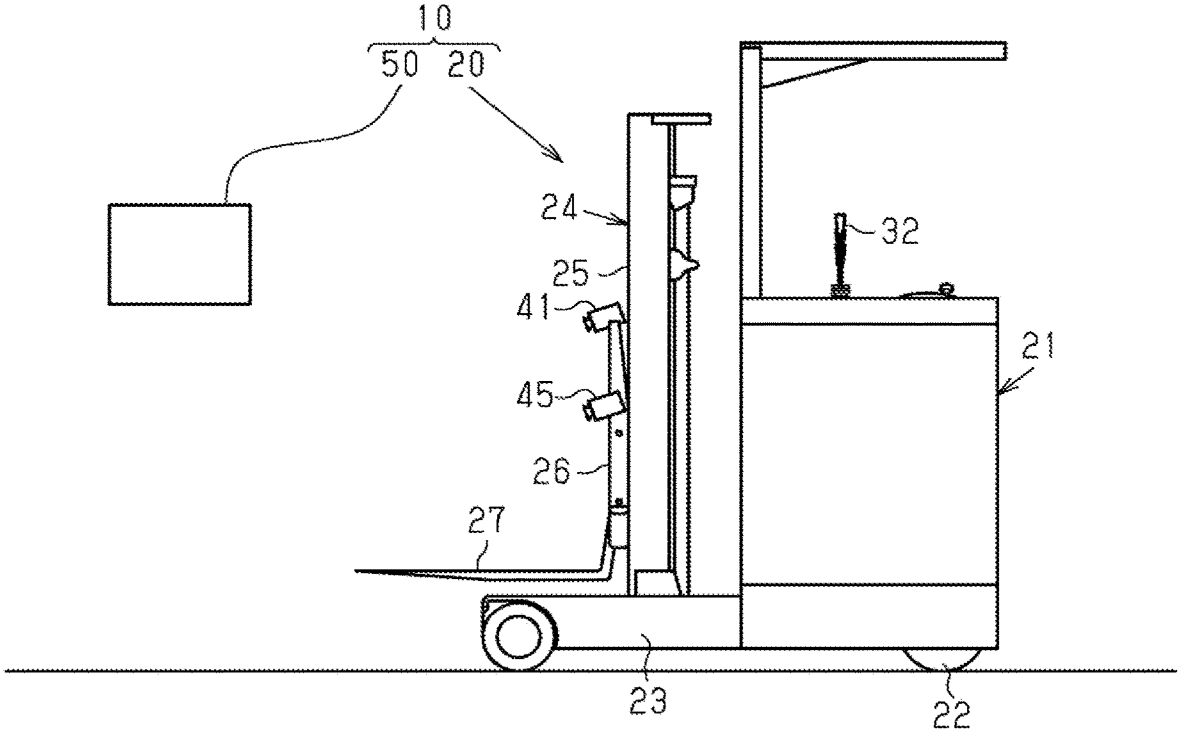
FIG. 1 is a schematic configuration view illustrating a remote operation system.

As illustrated in FIG. 1, a remote operation system 10 includes a forklift truck 20 serving as a load handling vehicle, and a remote operation device 50 used for remote operation of the forklift truck 20. The forklift truck 20 is placed at a work site where operations such as conveyance of a load are performed. The remote operation device 50 refers to a device for an operator located in an operation chamber to remotely operate the forklift truck 20. The operation chamber is located at a place from which the work site is directly invisible or difficult to be directly viewed. In the following description, front, rear, right, and left directions refer to front, rear, right, and left directions of the forklift truck 20. A right-left direction of the forklift truck 20 corresponds to a width direction of the forklift truck 20.

The forklift truck 20 of the present embodiment is of a reach type. The forklift truck 20 may be of a counterbalance type. The forklift truck 20 includes a vehicle body 21, wheels 22 provided to the vehicle body 21, reach legs 23 extending in a forward direction of the vehicle body 21, and a load handling apparatus 24 disposed in a front of the vehicle body 21. The reach legs 23 are provided by a pair of reach legs 23 distanced from each other in the right-left direction. The load handling apparatus 24 includes a mast 25 extending upward from the pair of reach legs 23, a backrest 26 attached to the mast 25, and forks 27 attached to the backrest 26. The forks 27 are provided by a pair of forks 27 distanced from each other in the right-left direction. The forks 27 serve as a load handling member that is a member on which the load is carried.

Figure 2:
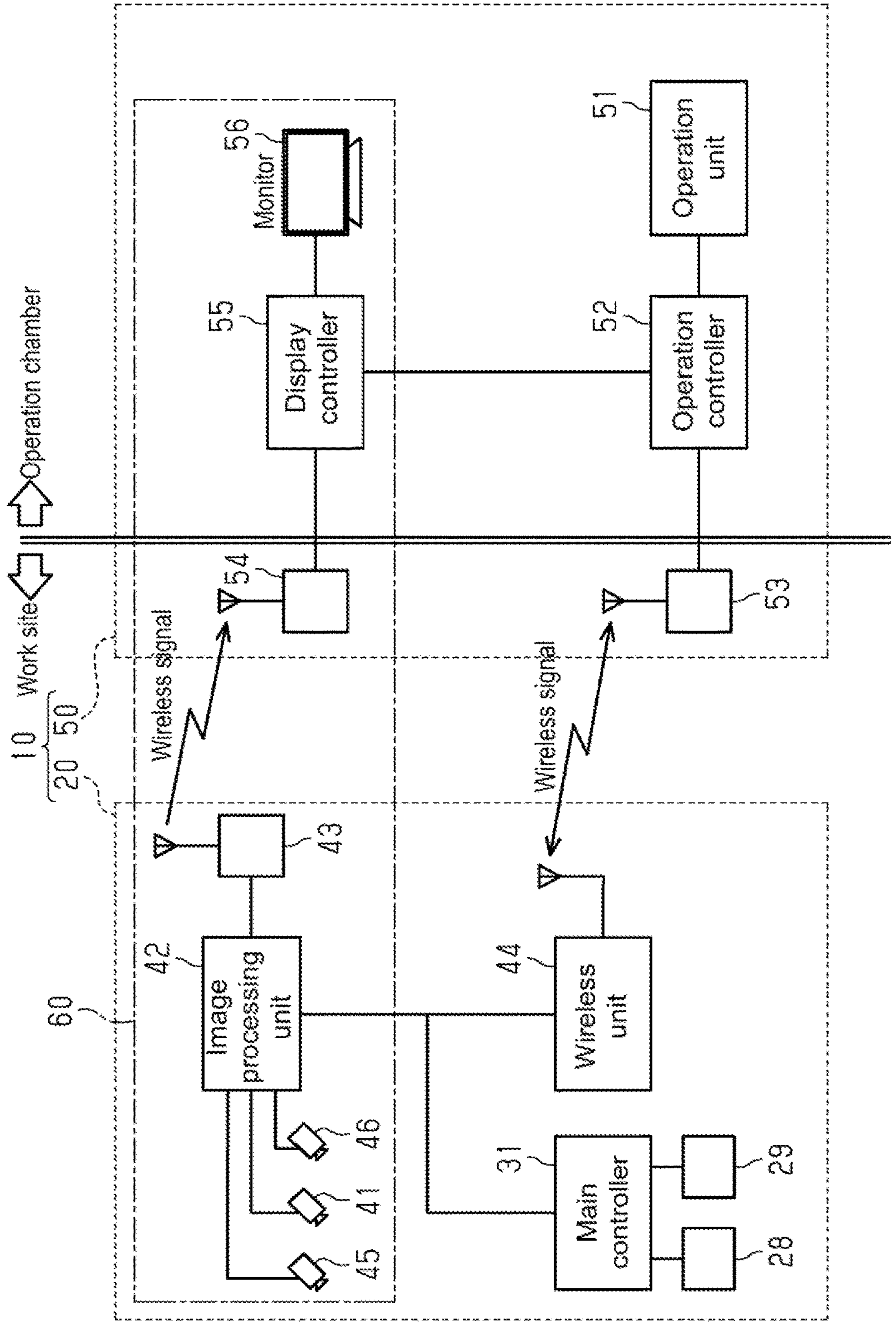
FIG. 2 is a schematic configuration view illustrating a forklift truck and a remote operation device.

As illustrated in FIGS. 1 and 2, the forklift truck 20 includes a drive assembly 28 configured to drive the forklift truck 20 to perform a traveling motion, a load handling assembly 29 configured to cause the forklift truck 20 to perform a load handling motion, a main controller 31, and load handling operating members 32.

The drive assembly 28 includes a drive source configured to rotate the wheels 22, and a steering assembly configured to steer the forklift truck 20. The load handling assembly 29 includes a load handling pump configured to supply a hydraulic oil to a hydraulic cylinder that is configured to activate the mast 25, a drive source configured to drive the load handling pump, and a valve that regulates flow of the hydraulic oil. The load handling assembly 29 configured to cause the load handling apparatus 24 to perform a reach motion for moving the mast 25 along the pair of reach legs 23 in a front-rear direction, a tilt motion for tilting the mast 25, and a lift motion for lifting the mast 25 up and down. The load handling motion refers to a motion including one of the reach motion, the tilt motion, and the lift motion.

The main controller 31 includes a CPU, a RAM, a ROM, an input-output device (I/O), a bus line that connects these components, and the like. Processing performed by the main controller 31 may be software processing by the CPU executing a program prestored in a real memory such as the ROM, or hardware processing executed by a specialized electronic circuit. The main controller 31 controls the drive assembly 28 and the load handling assembly 29 so that the forklift truck 20 performs the traveling motion and the load handling motions.

The load handling operating members 32 are provided individually corresponding to the reach motion, the tilt motion, and the lift motion, so that the load handling motions associated with the respective load handling operating members 32 are performed. The load handling operating members 32 are operated by a driver sitting in the forklift truck 20. The forklift truck 20 includes an operation amount detector configured to detect an operation amount of the load handling operating members 32, and a result detected by the operation amount detector is output to the main controller 31. The operation amount detector is not illustrated. The forklift truck 20 also includes a traveling operation unit to be operated by the driver. The traveling operation unit is not illustrated. The main controller 31 controls the drive assembly 28 and the load handling assembly 29 according to the respective operations of the traveling operation unit and the load handling operating members 32. In other words, the forklift truck 20 according to the present embodiment is capable of being operated by the driver of the forklift truck 20, in addition to being remotely operated with the remote operation device 50.

The forklift truck 20 includes a camera 41, an image processing unit 42, a vehicle-side wireless unit 43, a wireless unit 44, and two stereoscopic cameras 45 and 46. The camera 41 includes, for example, a charge coupled device (CCD) image sensor, a complementary metal oxide semiconductor (CMOS) image sensor, or the like.

The camera 41 is installed so that an imaging range of the camera 41 includes the forks 27 in a state where the forks 27 carry no load. The imaging range is defined by a horizontal angle of view and a vertical angle of view. Specifically, the camera 41 is installed so that the imaging range of the camera 41 includes tips of the two forks 27 in the state where the forks 27 carry no load. The camera 41 is attached to a member that moves up and down together with the forks 27. In the present embodiment, the camera 41 is attached to the backrest 26. The camera 41 is disposed above the forks 27 in the vertical direction. The camera 41 is disposed so as to face forward of the forklift truck 20 and tilt downward in the vertical direction. In other words, the camera 41 is disposed so as to view the forks 27 from above in the vertical direction, having a bird's eye view.

In the present embodiment, the two stereoscopic cameras 45 and 46 have an identical configuration. The two stereoscopic cameras 45 and 46 include two cameras each including a CCD image sensor, a CMOS image sensor, or the like. The stereoscopic cameras 45 and 46 serve as sensors. The two cameras of the stereoscopic cameras 45 and 46 are disposed so that optical axes thereof are parallel to each other. Since the two cameras of the stereoscopic cameras 45 and 46 are distanced from each other, objects in images captured by the two cameras are displaced from each other although the two cameras capture a same object. In other words, the images of the same object captured by the two cameras have pixel displacement from each other by a difference in the distance between the two cameras.

The stereoscopic cameras 45 and 46 are attached to the member that moves up and down together with the pair of forks 27. In the present embodiment, the stereoscopic cameras 45 and 46 are attached to the backrest 26. The stereoscopic cameras 45 and 46 are disposed above the pair of forks 27 in the vertical direction. The stereoscopic cameras 45 and 46 are disposed so as to face forward of the forklift truck 20 and tilt downward in the vertical direction.

Figure 3:
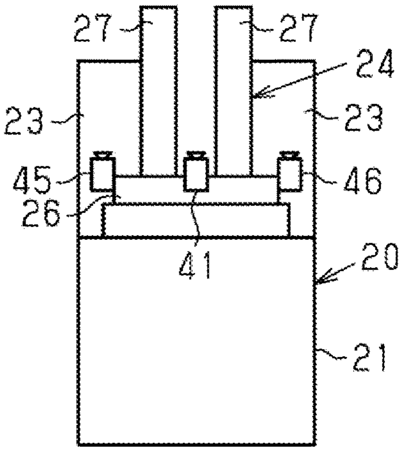
FIG. 3 is a schematic plan view illustrating the forklift truck.

As illustrated in FIG. 3, the two stereoscopic cameras 45 and 46 are distanced from each other in the right-left direction. In the present embodiment, the two stereoscopic cameras 45 and 46 are disposed at respective ends of the backrest 26 in the right-left direction. One of the two stereoscopic cameras 45 and 46 is referred to as a first stereoscopic camera 45 and the other of the two stereoscopic cameras 45 and 46 is referred to as a second stereoscopic camera 46. The first stereoscopic camera 45 is disposed at a left end of the backrest 26. The second stereoscopic camera 46 is disposed at a right end of the backrest 26.

Figure 4:
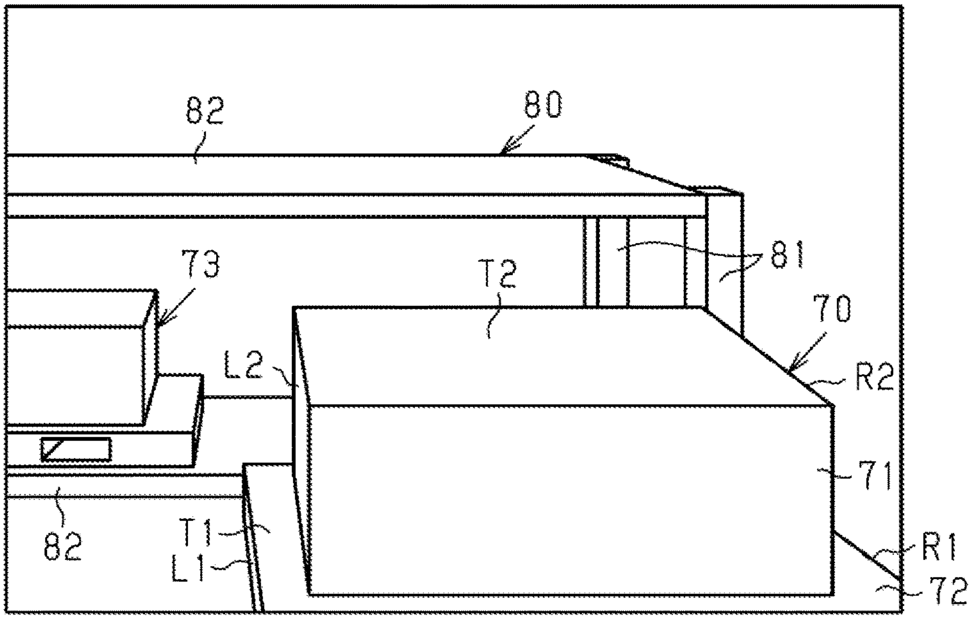
FIG. 4 is a schematic view illustrating an imaging range of a first stereoscopic camera.

As illustrated in FIG. 4, each of the stereoscopic cameras 45 and 46 is installed so that an imaging range thereof, which is defined by the horizontal angle of view and the vertical angle of view, includes a side portion and a top surface of a load 70 carried on the forks 27. The load 70 is referred to a load to be carried on the forks 27. In the present embodiment, the load 70 carried on the forks 27 includes a pallet 72 together with a conveyance article 71 placed on the pallet 72, as an example. However, the load 70 may include only the pallet 72 when the pallet 72 alone is carried on the forks 27.

FIG. 4 schematically illustrates the imaging range of the first stereoscopic camera 45. As illustrated in FIG. 4, the imaging range of the first stereoscopic camera 45 includes a left end L1 and a top surface T1 of the pallet 72, and a left end L2 and a top surface T2 of the conveyance article 71, in a state where the forks 27 carry the load 70. The imaging range of the second stereoscopic camera 46, although it is not illustrated, includes a right end R1 and the top surface T1 of the pallet 72, and a right end R2 and the top surface T2 of the conveyance article 71, in the state where the forks 27 carry the load 70.

The image processing unit 42 includes a CPU, a RAM, a ROM, an I/O, a bus line that connects these components, and the like. Processing performed by the image processing unit 42 may be software processing by the CPU executing a program prestored in a real memory such as the ROM, or hardware processing executed by a specialized electronic circuit. The image processing unit 42 obtains image data from the camera 41 at predetermined intervals. The image data is provided by, for example, red-green-blue (RGB) data. The image processing unit 42 processes the image data obtained from the camera 41. The image processing unit 42 obtains respective image data from the stereoscopic cameras 45 and 46 at predetermined intervals. The image data are provided by, for example, red-green-blue (RGB) data. The image processing unit 42 processes the respective image data obtained from the stereoscopic cameras 45 and 46. The image processing unit 42 and the main controller 31 are capable of communicating with each other on a communication protocol such as a controller area network (CAN) and a local interconnect network (LIN).

The vehicle-side wireless unit 43 is a communication interface configured to transmit the image data obtained from the camera 41 to the remote operation device 50. The vehicle-side wireless unit 43 modulates the image data output from the image processing unit 42 to generate a wireless signal. The vehicle-side wireless unit 43 transmits the wireless signal.

The wireless unit 44 is a communication interface configured to intercommunicate with the remote operation device 50. The wireless unit 44 includes a modulator configured to modulate data output from the main controller 31 and the image processing unit 42 to generate a wireless signal, and a demodulator configured to demodulate a wireless signal received from the remote operation device 50 and output the demodulated data to the main controller 31. The wireless unit 44 transmits information about the forklift truck 20 and surroundings of the forklift truck 20 to the remote operation device 50. The information about the surroundings of the forklift truck 20 includes, for example, information about the load 70. The information about the forklift truck 20 includes, for example, a steering angle and a speed of the forklift truck 20.

The following will describe the remote operation device 50.

As illustrated in FIG. 2, the remote operation device 50 includes an operation unit 51 configured to operate the forklift truck 20, an operation controller 52, a first wireless unit 53, a second wireless unit 54, a display controller 55, and a monitor 56. The operation unit 51, the operation controller 52, the display controller 55, and the monitor 56 are disposed in the operation chamber. The first wireless unit 53 and the second wireless unit 54 are disposed in the work site.

The operation unit 51 is operated by the operator located in the operation chamber. The operation unit 51 is provided by, for example, a tiltable lever. The operation unit 51 is used for operating the forklift truck 20 with the remote operation device 50. The operation unit 51 includes a traveling operation unit that is operated to cause the forklift truck 20 to perform the traveling motion, and a load handling operating member that is operated to cause the forklift truck 20 to perform the load handling motion. An operation amount of the operation unit 51 is detected by an operation amount detector, which is not illustrated, and output to the operation controller 52.

The operation controller 52 includes a CPU, a RAM, a ROM, an I/O, a bus line that connects these components, and the like. Processing performed by the operation controller 52 may be software processing by the CPU executing a program prestored in a real memory such as the ROM, or hardware processing executed by a specialized electronic circuit. The operation controller 52 generates a command according to the operation amount of the operation unit 51.

The first wireless unit 53 is a communication interface configured to intercommunicate with the wireless unit 44. The first wireless unit 53 includes a modulator configured to modulate data output from the operation controller 52 to generate a wireless signal, and a demodulator configured to demodulate a wireless signal received from the wireless unit 44 and output the demodulated data to the operation controller 52.

The operation controller 52 transmits data including the command according to the operation amount of the operation unit 51 to the first wireless unit 53 so as to give the command to the main controller 31 via the first wireless unit 53 and the wireless unit 44. The main controller 31, upon receipt of the command from the operation controller 52, controls the drive assembly 28 and the load handling assembly 29 according to the command. This allows the operator located in the operation chamber to remotely operate the forklift truck 20. The operation controller 52 is capable of identifying the information about the forklift truck 20 and the surroundings of the forklift truck 20 via the first wireless unit 53. In the present embodiment, the forklift truck 20 is operated by the operator located in the operation chamber. The operator located in the operation chamber is the operator of the load handling vehicle.

The second wireless unit 54 is a communication interface configured to receive the image data transmitted from the vehicle-side wireless unit 43. The second wireless unit 54 demodulates the wireless signal received from the vehicle-side wireless unit 43 and outputs the demodulated image data to the display controller 55.

The display controller 55 includes a processor such as a CPU and a graphics processing unit (GPU), a RAM, a ROM, an I/O, a bus line that connects these components, and the like. Processing performed by the display controller 55 may be software processing by the CPU executing a program prestored in a real memory such as the ROM, or hardware processing executed by a specialized electronic circuit. The display controller 55 outputs the image data received from the second wireless unit 54 to the monitor 56. In addition, the display controller 55 may output, to the monitor 56, data of information required for driving the forklift truck 20 to be displayed on the monitor 56. The display controller 55 and the operation controller 52 are configured to exchange information with each other.

The monitor 56 is a display on which the image data output from the display controller 55 is displayed as a captured image. The monitor 56 is placed at a position at which the monitor 56 is visible from the operator located in the operation chamber. The image data output from the display controller 55 is displayed as the captured image on the monitor 56 so that the image captured by the camera 41 is visible from the operator. Information for assisting the operation of the forklift truck 20 is also displayed on the monitor 56. The operator located in the operation chamber is allowed to operate the forklift truck 20 while observing the monitor 56.

The following will describe processing performed by the remote operation system 10 for displaying information on the monitor 56. The following description takes a case of performing a load placing operation with the forklift truck 20 as an example. The load placing operation refers to an operation in which the load 70 carried on the load handling apparatus 24 is to be placed at a load placing location. In the load placing operation, the load 70 carried on the load handling apparatus 24 is positioned above the load placing location in the vertical direction, and then the forks 27 are lowered. After the load 70 is placed at the load placing location, the forks 27 are removed from the load 70 by moving the forklift truck 20 backward.

Figure 5:
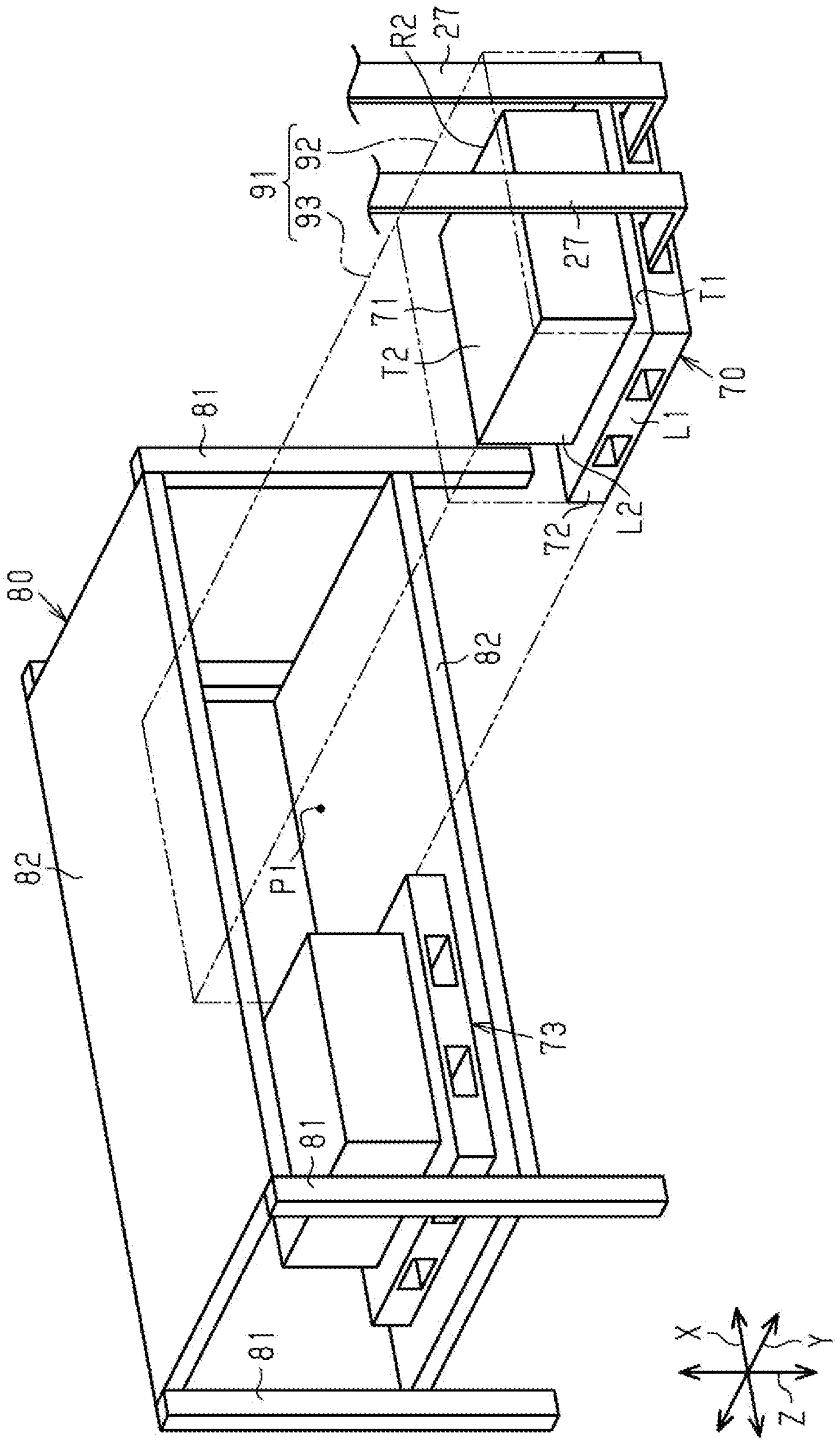
FIG. 5 is a schematic view illustrating a relation between a rack and a load during a load placing operation.

FIG. 5 illustrates a case of placing the load 70 on a rack 80 as an example. The rack 80 includes shelf plates 82 supported by poles 81. The operator operates the forklift truck 20 to transfer the load 70 carried on the forks 27 onto one of the shelf plates 82. The load 70 in the present embodiment is provided by a load including the conveyance article 71 and the pallet 72 on which the conveyance article 71 is placed. The one of the shelf plates 82 already keeps, thereon, a load 73, i.e., a load different from the load 70 carried on the load handling apparatus 24. The operator transfers the load 70 carried on the load handling apparatus 24 into an empty space in the rack 80 between the load 73 already kept on the one of the shelf plates 82 and some of the poles 81 farther from the load 73. A position P1 between the load 73 already kept on the one of the shelf plates 82 and some of the poles 81 farther from the load 73 is the load placing location.

Figure 6:
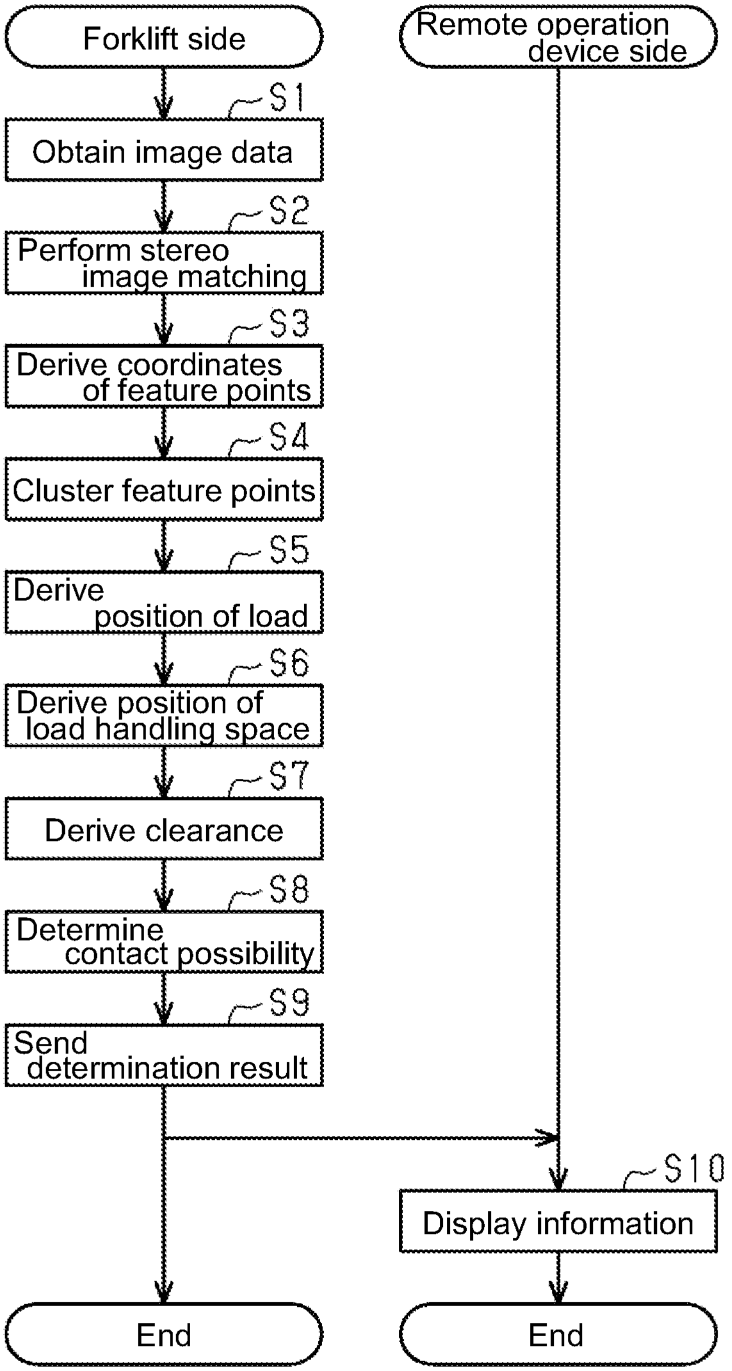
FIG. 6 is a flowchart illustrating a series of steps processed by the remote operation system.

In Step S1 as illustrated in FIG. 6, the image processing unit 42 obtains the respective image data from the stereoscopic cameras 45 and 46. The image processing unit 42 obtains the respective image data individually from the stereoscopic cameras 45 and 46.

In Step S2, the image processing unit 42 performs stereo image matching processing to obtain a parallax image. Pixels in the parallax image are mapped by parallaxes (px). The parallax image refers to data in which parallaxes are mapped onto the pixels. The parallax image need not always be displayed. The parallax is obtained by comparing the two image data captured by the two cameras of the stereoscopic cameras 45 and 46, and deriving a difference in the number of pixels with respect to an identical feature point between the two image data. The feature points refer to identifiable portions of an object as a boundary, such as an edge of the object. The feature points are detectable based on brightness data or the like. The image processing unit 42 performs the stereo image matching processing individually for the stereoscopic cameras 45 and 46 to obtain a parallax image for each of the stereoscopic cameras 45 and 46.

Figure 7:
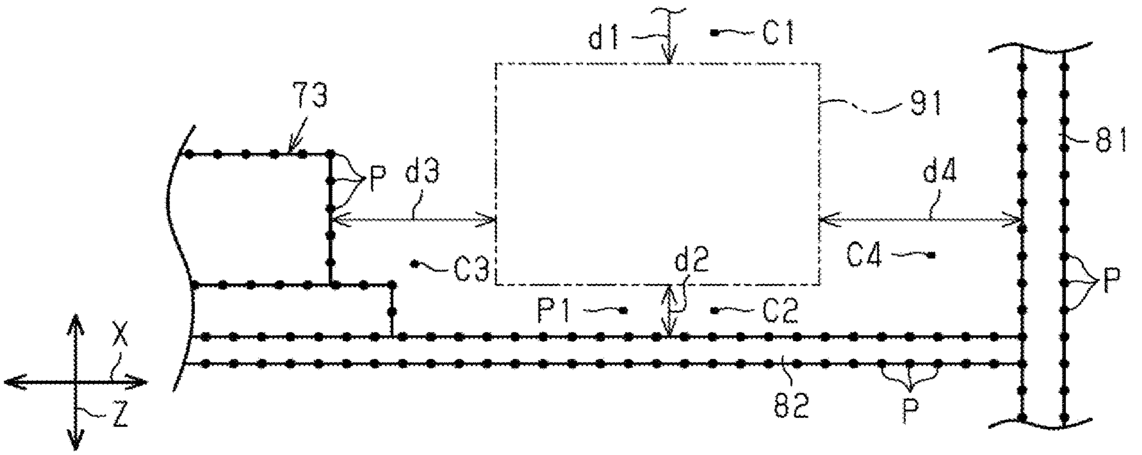
FIG. 7 is a schematic view illustrating clearances between a load handling space and adjacent objects adjacent to the load.

In Step S3, the image processing unit 42 derives coordinates of the feature points in a coordinate system in a real space. The coordinate system in the real space is a coordinate system that includes an X-axis extending in a vehicle width direction of the forklift truck 20 with the forklift truck 20 placed on a horizontal plane, i.e., one of horizontal directions, a Y-axis extending in an orthogonal direction to the X-axis, i.e., another one of the horizontal directions, and a Z-axis extending in the vertical direction. Derivation of the coordinates of the feature points is performed by deriving the coordinates of the feature points in a camera coordinate system based on lengths of base lines of the stereoscopic cameras 45 and 46, focal lengths of the stereoscopic cameras 45 and 46, and the parallax images obtained in Step S2, and then converting the coordinates in the camera coordinate system into the coordinates in the coordinate system in the real space. The image processing unit 42 derives the coordinates of the feature points individually by the parallax images obtained in Step S2. In the present embodiment, as illustrated in FIG. 7, edges of the rack 80 and edges of the load 73 in the rack 80 are extracted as feature points P. In the present embodiment, directions of coordinate axes of the first stereoscopic camera 45 and the second stereoscopic camera 46 are identical, but origins of the coordinate systems of the first stereoscopic camera 45 and the second stereoscopic camera 46 are not identical. In other words, the image processing unit 42 derives the coordinates of the feature points in the individual coordinate systems for the first stereoscopic camera 45 and the second stereoscopic camera 46. In the following description, the coordinate refers to the coordinate of the coordinate system in the real space. Also, a direction of the X-axis extending is referred to as an X-axis direction, a direction of the Y-axis extending is referred to as a Y-axis direction, and a direction of the Z-axis extending is referred to as a Z-axis direction, where the X-axis, the Y-axis, and the Z-axis are the coordinate axes of the coordinate system in the real space.

In Step S4 as illustrated in FIG. 6, the image processing unit 42 clusters the feature points to extract an object. The image processing unit 42 extracts a group of points as an object where the group of points refers to a set of the feature points that is presumed to represent a single object among the feature points representing parts of objects. The image processing unit 42, based on the coordinates of the feature points derived in Step S3, identifies the feature points located in a given range as a group of points so as to cluster the group of points. The image processing unit 42 regards the clustered group of points as an object. Various methods may be applied to clustering the feature points in Step S4. The image processing unit 42 extracts the objects by clustering the feature points obtained from the stereoscopic cameras 45 and 46, individually. The image processing unit 42 performing the above processing in Step S4 serves as an object extraction unit.

In Step S5, the image processing unit 42 derives a position of the load 70 in each of the coordinate systems in the real space. The position of the load 70 is represented by coordinates of the load 70 in each of the coordinate systems in the real space. The image processing unit 42 identifies an object corresponding to the load 70 among the objects extracted in Step S4. Since a positional relation of each of the stereoscopic cameras 45 and 46 with the forks 27 is invariable, the image processing unit 42 is allowed to determine which object corresponds to the load 70 based on coordinates of the object in each of the coordinate systems in the real space. In other words, since the coordinates of the feature points of the load 70 carried on the forks 27 are presumable, the group of points that includes the feature points corresponding to the above coordinates is determined as the load 70. The image processing unit 42, by identifying the object corresponding to the load 70, derives the position of the load 70 based on the coordinates of the feature points of the load 70.

The position of the load 70 is derivable from the coordinates of the object that is determined to correspond to the load 70. In the present embodiment, a bottom surface, a top surface, a left end, and a right end of the load 70 are derived as the position of the load 70. The bottom surface of the load 70 is a bottom surface of the pallet 72. The top surface of the load 70 is a surface at an uppermost position of the load 70 in the vertical direction. The top surface of the load 70 refers to the top surface T1 of the pallet 72 when the conveyance article 71 is not placed on the pallet 72, whereas the top surface of the load 70 refers to the top surface T2 of the conveyance article 71 when the conveyance article 71 is placed on the pallet 72. The left end of the load 70 is a leftmost part of the load 70. The left end of the load 70 refers to the left end L1 of the pallet 72 when the conveyance article 71 is not placed on the pallet 72 or when the conveyance article 71 placed on the pallet 72 is not protruded leftward from the left end of the pallet 72, whereas the left end of the load 70 refers to the left end L2 of the conveyance article 71 when part of the conveyance article 71 placed on the pallet 72 is protruded leftward from the left end L1 of the pallet 72. The right end of the load 70 is a rightmost part of the load 70. The right end of the load 70 refers to the right end R1 of the pallet 72 when the conveyance article 71 is not placed on the pallet 72 or when the conveyance article 71 placed on the pallet 72 is not protruded rightward from the right end R1 of the pallet 72, whereas the right end of the load 70 refers to the right end R2 of the conveyance article 71 when part of the conveyance article 71 placed on the pallet 72 is protruded rightward from the right end R1 of the pallet 72.

Each of the stereoscopic cameras 45 and 46 is disposed so that the top surface T1 of the pallet 72 is included in the imaging range. This allows the image processing unit 42 to derive coordinates of the top surface T1 of the pallet 72 based on the parallax image obtained from each of the image data of the stereoscopic cameras 45 and 46. The pallet 72 has known dimensions specified by an authorized regulation. This allows the image processing unit 42 to derive coordinates of the bottom surface of the pallet 72 from the coordinates of the top surface T1 of the pallet 72. Specifically, the coordinates of the bottom surface of the pallet 72 in the coordinate system in the real space are derivable by displacing a Z coordinate among the coordinates of the top surface T1 of the pallet 72 downward in the vertical direction by a thickness of the pallet 72. The thickness of the pallet 72 refers to a difference in the Z coordinate between the bottom surface and the top surface of the pallet 72.

Each of the stereoscopic cameras 45 and 46 is disposed so that the top surface of the load 70 is included in the imaging range. This allows the image processing unit 42 to derive coordinates of the top surface of the load 70 based on the parallax image obtained from each of the image data of the stereoscopic cameras 45 and 46.

The first stereoscopic camera 45 is disposed so that the left end of the load 70 is included in the imaging range. This allows the image processing unit 42 to derive coordinates of the left end of the load 70 based on the parallax image obtained from the image data of the first stereoscopic camera 45.

The second stereoscopic camera 46 is disposed so that the right end of the load 70 is included in the imaging range. This allows the image processing unit 42 to derive coordinates of the right end of the load 70 based on the parallax image obtained from the image data of the second stereoscopic camera 46.

The image processing unit 42 is allowed to derive the coordinates of the top surface, the bottom surface, and the left end of the load 70 by deriving the coordinates of the load 70 based on the parallax image obtained from image data of the first stereoscopic camera 45. The image processing unit 42 is also allowed to derive the coordinates of the right end of the load 70 when the right end of the load 70 such as the right end R1 of the pallet 72 is captured in the image. Since the pallet 72 has the known dimensions specified by the authorized regulation, the coordinates of the right end of the load 70 may be derived from the coordinates of the left end of the load 70. The objective of the first stereoscopic camera 45 is to capture an image of the left side of the load 70. Thus, the coordinates of the right end of the load 70 need not be derived.

The image processing unit 42 is allowed to derive the coordinates of the top surface, the bottom surface, and the right end of the load 70 by deriving the coordinates of the load 70 based on the parallax image obtained from image data of the second stereoscopic camera 46. The image processing unit 42 is also allowed to derive the coordinates of the left end of the load 70 when the left end of the load 70 such as the left end L1 of the pallet 72 is captured in the image. Since the pallet 72 has the known dimensions specified by the authorized regulation, the coordinates of the left end of the load 70 may be derived from the coordinates of the right end of the load 70. The objective of the second stereoscopic camera 46 is to capture an image of the right side of the load 70. Thus, the coordinates of the left end of the load 70 need not be derived.

In short, the image processing unit 42 derives the coordinates of the load 70 based on the image data within a view obtained by the first stereoscopic camera 45. The image processing unit 42 also derives the coordinates of the load 70 based on the image data within a view obtained by the second stereoscopic camera 46.

In Step S6 as illustrated in FIGS. 5 and 6, the image processing unit 42 derives a position of a load handling space 91 in the coordinate system in the real space. The load handling space 91 refers to a space occupied by the load 70 during load handling work performed by the load handling apparatus 24. The load handling work includes the load placing operation and a load picking up operation. The load handling space 91 during the load placing operation is a space that the load 70 is presumed to occupy during a period from when the forklift truck 20 located at a place distanced from the load placing location starts approaching the load placing location to when the forklift truck 20 places the load 70 at the load placing location. The load handling space 91 during the load placing operation includes an occupying space 92 occupied by the load 70 carried on the load handling apparatus 24, and an extension space 93 extending from the occupying space 92 in the Y-axis direction. The occupying space 92 may be a space surrounded by the feature points forming the load 70. Alternatively, the occupying space 92 may be a space between the bottom surface of the pallet 72 and a surface formed by extending the bottom surface of the pallet 72 upward to a height of the top surface of the load 70, as illustrated in FIG. 5. The position of the load handling space 91 is represented by coordinates of an external boundary of the load handling space 91. The coordinates of the external boundary of the load handling space 91 represent a size of the load handling space 91. The image processing unit 42 is allowed to derive the extension space 93 in the coordinate system in the real space by changing a Y coordinate of the occupying space 92. Specifically, the image processing unit 42 is allowed to derive the extension space 93 by extending the occupying space 92, which is occupied by the load 70, in the forward direction of the forklift truck 20 along the Y-axis. The load handling space 91 is a space where the load 70 carried on the load handling apparatus 24 passes when the forklift truck 20 is advanced with the load handling apparatus 24 kept in a state when the image data is obtained from the stereoscopic cameras 45 and 46 in Step S1. The above state of the load handling apparatus 24 is represented by a height of the forks 27 and an orientation of the load handling apparatus 24. The image processing unit 42 derives the load handling space 91 from the coordinates of the load 70 based on the image data obtained from the first stereoscopic camera 45. The image processing unit 42 derives the load handling space 91 from the coordinates of the load 70 based on the image data obtained from the second stereoscopic camera 46. The image processing unit 42 derives the load handling space 91 individually in the coordinate system with respect to the first stereoscopic camera 45 and the coordinate system with respect to the second stereoscopic camera 46. The image processing unit 42 performing the above processing in Step S6 serves as a load handling space derivation unit.

In Step S7, the image processing unit 42 derives values of clearances between the load handling space 91 positioned at the load placing location and adjacent objects adjacent to the load handling space 91. For placing the load 70 at the load placing location, the forklift truck 20 is positioned in front of the rack 80, and advanced toward the load placing location. While the load 70 is being transferred to the load placing location, the extension space 93 is positioned at the load placing location. As described above, the load handling space 91 is the space where the load 70 carried on the load handling apparatus 24 passes while the forklift truck 20 is advanced with the load handling apparatus 24 kept in the state when the image data is obtained from the stereoscopic cameras 45 and 46 in Step S1. Thus, the clearances between the load handling space 91 and the adjacent objects adjacent to the load handling space 91 are clearances between the load 70 and the associated adjacent objects adjacent to the load 70 while the forklift truck 20 is advanced until the load 70 is positioned above the load placing location in the vertical direction.

In the present embodiment, the image processing unit 42 derives the values of the clearances present above, below, to the left of, and to the right of the load handling space 91. Referring to an example illustrated in FIG. 5, the load 73 is present to the left of the load handling space 91, some of the poles 81 farther from the load 73 are present to the right of the load handling space 91, and the shelf plates 82 are present above and below the load handling space 91. Therefore, the load 73, some of the poles 81 farther from the load 73, and the shelf plates 82 are the adjacent objects adjacent to the load handling space 91. The load 70, the poles 81, and the shelf plates 82 are clustered and extracted as objects in Step S4. The image processing unit 42 is allowed to extract the adjacent objects adjacent to the load handling space 91 based on coordinates of the load handling space 91 and the coordinates of the associated objects extracted in Step S4. Among the objects extracted in Step S4, an object that is located above the load handling space 91 in the vertical direction and has a Z coordinate closest to the load handling space 91 is an adjacent object located above the load handling space 91 in the vertical direction. This adjacent object is the other of the shelf plates 82 located above the load handling space 91 in the vertical direction. Among the objects extracted in Step S4, an object that is located below the load handling space 91 in the vertical direction and has a Z coordinate closest to the load handling space 91 is an adjacent object located below the load handling space 91 in the vertical direction. This adjacent object is the one of the shelf plates 82 located below the load handling space 91 in the vertical direction. Among the objects extracted in Step S4, an object that is located to the left of the load handling space 91 and has an X coordinate closest to the load handling space 91 is an adjacent object located to the left of the load handling space 91. This adjacent object is the load 73 kept on the one of the shelf plate 82. Among the objects extracted in Step S4, an object that is located to the right of the load handling space 91 and has an X coordinate closest to the load handling space 91 is an adjacent object located to the right of the load handling space 91. This adjacent object are some of the poles 81 farther from the load 73.

As illustrated in FIG. 7, the image processing unit 42 derives values d1, d2, d3, and d4 of respective clearances C1, C2, C3, and C4 between the load handling space 91 and the associated adjacent objects adjacent to the load handling space 91. In FIG. 7, the adjacent objects present above the load handling space 91 are not illustrated. The image processing unit 42 derives the values d1, d2, d3 and d4 of the respective clearances C1, C2, C3 and C4 present above, below, to the left of, and to the right of the load handling space 91. The values of d1 to d4 of the respective clearances C1 to C4 are derived from the coordinates of the load handling space 91 and coordinates of the associated adjacent objects adjacent to the load handling space 91. The image processing unit 42 derives the value d1 of the clearance C1 present above the load handling space 91 from a difference between a Z coordinate of the load handling space 91 and the Z coordinate of the adjacent object located above the load handling space 91 in the vertical direction. The image processing unit 42 derives the value d2 of the clearance C2 present below the load handling space 91 from a difference between the Z coordinate of the load handling space 91 and the Z coordinate of the adjacent object located below the load handling space 91 in the vertical direction. The image processing unit 42 derives the value d3 of the clearance C3 to the left of the load handling space 91 from a difference between an X coordinate of the load handling space 91 and the X coordinate of the adjacent object located to the left of the load handling space 91. The image processing unit 42 derives the value d4 of the clearance C4 to the right of the load handling space 91 from a difference between the X coordinate of the load handling space 91 and the X coordinate of the adjacent object located to the right of the load handling space 91. The image processing unit 42 derives the values d1 to d4 of the respective clearances C1 to C4 between the load handling space 91 and the associated adjacent objects adjacent to the load handling space 91 individually in the coordinate system with respect to the first stereoscopic camera 45 and the coordinate system with respect to the second stereoscopic camera 46. In the coordinate system with respect to the first stereoscopic camera 45, the value d4 of the clearance C4 to the right of the load handling space 91 need not be derived. In the coordinate system with respect to the second stereoscopic camera 46, the value d3 of the clearance C3 to the left of the load handling space 91 need not be derived. In other words, the two stereoscopic cameras 45 and 46 are disposed to complement each other by covering possible blind spots so that the clearances C1, C2, C3 and C4 respectively present above, below, to the left of, and to the right of the load handling space 91 are derivable with the two stereoscopic cameras 45 and 46. The image processing unit 42 performing the above processing in Step S7 serves as a clearance derivation unit.

In Step S8 as illustrated in FIG. 6, the image processing unit 42 determines a contact possibility, i.e., whether or not the load 70 contacts any of the adjacent objects adjacent to the load 70. The contact possibility is determined based on the values d1 to d4 of the respective clearances C1 to C4 derived in Step S7. When any of the values d1, d2, d3, and d4 of the respective clearances C1, C2, C3, and C4 between the load 70 and an associated adjacent object adjacent to the load 70 is less than a threshold value, the image processing unit 42 determines that the load 70 is likely to contact the adjacent object adjacent to the load 70. It is to be noted that the image processing unit 42 determines that any of the clearances C1, C2, C3, and C4 is less than the threshold value even when the respective clearance C1, C2, C3, or C4 is not present between the load 70 and the associated adjacent object adjacent to the load 70. The threshold value is set in consideration of various tolerances such as a measurement tolerance, an amount of displacement of a traveling direction of the forklift truck 20 caused by surface roughness of the floor, and margins. As to the clearances C1 and C2 above and below the load handling space 91, the image processing unit 42 determines whether or not the values d1 and d2 in the Z-axis direction are less than the threshold value and determines that the load 70 is likely to contact the associated adjacent object adjacent to the load 70 when the value d1 or d2 of the respective clearance C1 or C2 in the Z-axis direction is less than the threshold value, whereas the image processing unit 42 determines that the load 70 is unlikely to contact the associated adjacent object adjacent to the load 70 when the values d1 and d2 of the respective clearances C1 and C2 in the Z-axis direction are equal to or greater than the threshold value. As to the clearances C3 and C4 to the left and right of the load handling space 91, the image processing unit 42 determines whether or not the values d3 and d4 of the respective clearances C3 and C4 in the X-axis direction is less than the threshold value and determines that the load 70 is likely to contact the associated adjacent object adjacent to the load 70 when the value d3 or d4 of the respective clearance C3 or C4 in the X-axis direction is less than the threshold value, whereas the image processing unit 42 determines that the load 70 is unlikely to contact the associated adjacent object adjacent to the load 70 when the values d3 and d4 of the respective clearances C3 and C4 in the X-axis direction are equal to or greater than the threshold value. The image processing unit 42 determines the contact possibilities individually in the coordinate system with respect to the first stereoscopic camera 45 and the coordinate system with respect to the second stereoscopic camera 46.

In Step S9, the image processing unit 42 wirelessly sends data including determination results of the contact possibilities determined in Step S8 through the wireless unit 44. The determination result of the contact possibility refers to information about some of peripheral portions of the load 70 that may possibly contact an adjacent object adjacent to the load 70. The determination result of the contact possibility is sent so that the display controller 55 identifies the information. In the present embodiment, the image processing unit 42 determines the contact possibilities individually in the coordinate system with respect to the first stereoscopic camera 45 and the coordinate system with respect to the second stereoscopic camera 46. This may cause a case where the image processing unit 42 determines that the load 70 is likely to contact an adjacent object adjacent to the load 70 in one of the coordinate systems but that the load 70 is unlikely to contact the adjacent object adjacent to the load 70 in the other of the coordinate systems. For example, there may possibly be a case where the value d1 of the clearance C1 present above the load handling space 91 is less than the threshold value in the coordinate system with respect to the first stereoscopic camera 45 whereas the value d1 of the clearance C1 present above the load handling space 91 is equal to or greater than the threshold value in the coordinate system with respect to the second stereoscopic camera 46. When the determination results obtained from the two coordinate systems are different from each other like in the above case, the image processing unit 42 may be set to select the determination result that the load 70 is likely to contact the adjacent object adjacent to the load 70.

In Step S10, under control of the display controller 55, relevant information according to the determination result of the contact possibility received by the display controller 55 is displayed on the monitor 56. It is noted that the display controller 55 may receive the determination result of the contact possibility either through the operation controller 52 or the first wireless unit 53.

Figure 8:
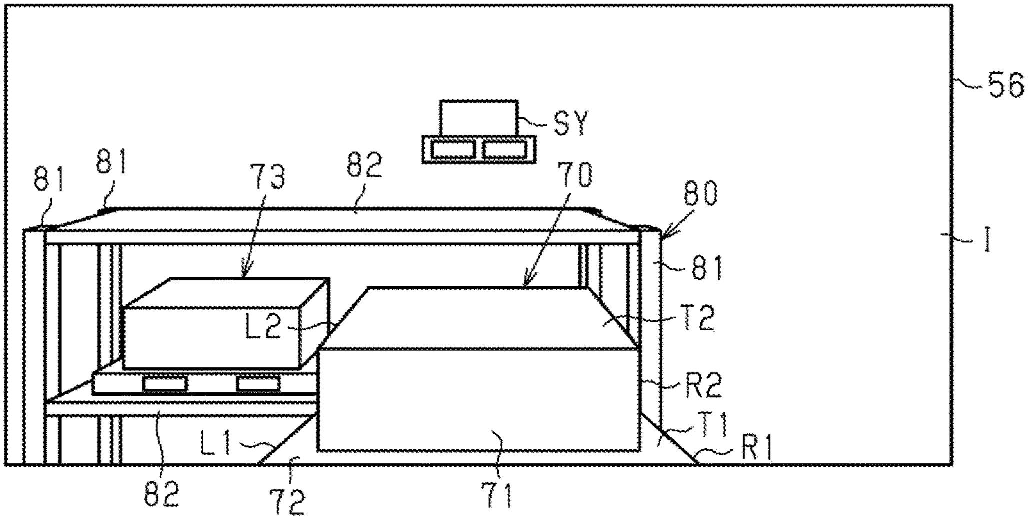
FIG. 8 is a display view on a monitor showing information about values of the clearances.

As illustrated in FIG. 8, a symbol SY superposed on a captured image I is displayed on the monitor 56, under the control of the display controller 55. The symbol SY represents the load 70 in miniature. The symbol SY may be set so that the symbol SY is always displayed on the monitor 56, or that the symbol SY is displayed only when the load handling apparatus 24 performs the load placing operation. In the case where the symbol SY is set to be displayed only when the load handling apparatus 24 performs the load placing operation, the symbol SY may be displayed when, for example, the load placing location is detected, under the control of the display controller 55. The load placing location is detected by extracting a marking at the load placing location, a shape of the load placing location, or the like by way of image recognition. As the image recognition, for example, pattern matching may be applied in which a template image stored in a memory device such as the ROM of the image processing unit 42 is compared with the image data so as to detect an area of the image data that well matches with the template image.

The symbol to be displayed superposingly on the captured image I varies according to the clearances C1 to C4 present between the load handling space 91 and the associated adjacent objects adjacent to the load handling space 91, under the control of the display controller 55. When all the values d1, d2, d3, and d4 of the respective clearances C1, C2, C3, and C4 are equal to or greater than the threshold value, the associated symbol SY that represents the load 70 in miniature is displayed on the monitor 56, as illustrated in FIG. 8.

Figure 9:
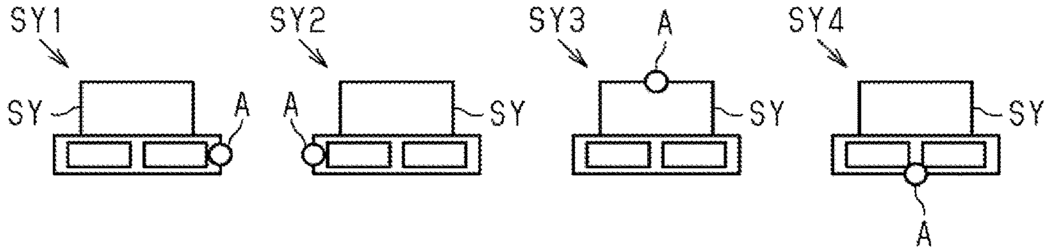
FIG. 9 is a diagram illustrating symbols according to the clearances.

As illustrated in FIG. 9, a symbol SY1 with a warming indication A on the right of the symbol SY that represents the load 70 in miniature is displayed on the monitor 56 when the value d4 of the clearance C4 between the load handling space 91 and the associated adjacent object adjacent to the load handling space 91 to the right of the load handling space 91 is less than the threshold value, under the control of the display controller 55. In this example illustrated in FIG. 9, a circle mark indicative of the warming indication A displayed on the right of the symbol SY warns the operator that a right side of the load 70 is likely to contact the associated adjacent object adjacent to the load 70. FIG. 9 illustrates the circle mark indicative of the warming indication A as an example. However, any type of indication may be used as long as the right side, as in the above case of the value d4 being less than the threshold value, of the symbol SY is highlighted. For example, use of a mark other than the circle as the warming indication A, use of a distinctive color for the right side of the symbol SY as a warming indication, or the like may be adopted.

When the value d3 of the clearance C3 between the load handling space 91 and the associated adjacent object located to the left of the load handling space 91 is less than the threshold value, a symbol SY2 with the warming indication A on the left of the symbol SY that represents the load 70 in miniature is displayed on the monitor 56, under the control of the display controller 55.

When the value d1 of the clearance C1 between the load handling space 91 and the associated adjacent object located above the load handling space 91 is less than the threshold value, a symbol SY3 with the warming indication A above the symbol SY that represents the load 70 in miniature is displayed on the monitor 56, under the control of the display controller 55.

When the value d2 of the clearance C2 between the load handling space 91 and the associated adjacent object located below the load handling space 91 is less than the threshold value, a symbol SY4 with the warming indication A below the symbol SY that represents the load 70 in miniature is displayed on the monitor 56, under the control of the display controller 55.

When both of the values d3 and d4 of the respective clearances C3 and C4 between the load handling space 91 and the associated adjacent objects located to the left of and to the right of the load handling space 91 are less than the threshold value, the warming indications A may be displayed both on the left and the right of the symbol SY. When the values of the clearances with a plurality of the adjacent objects adjacent to the load handling space 91 are less than the threshold value as in the above case, a plurality of the warming indications A may be displayed on the relevant sides of the symbol SY.

As to superposing indications of the symbol SY and the symbols SY1 to SY4, on-screen display (OSD) data indicative of the symbol SY and the symbols SY1 to SY4 is generated and superposed onto the image data under the control of the display controller 55. In the present embodiment, the symbol SY and the symbols SY1 to SY4 indicating whether or not the values d1 to d4 of the respective clearances C1 to C4 are less than the threshold value serve as information about the values of the clearances C1 to C4. The symbol SY and the symbols SY1 to SY4 are displayed superposingly on the captured image I under the control of the display controller 55 that serves as a display unit.

Displaying the symbol SY and the symbols SY1 to SY4 with the captured image I on the monitor 56 allows the operator to operate the forklift truck 20 while observing the captured image I on the monitor 56. In a case where any of the clearances C1 to C4 between the load 70 and the associated adjacent objects adjacent to the load 70 is not easily identifiable only with the captured image I, the operator may operate the forklift truck 20 by observing the symbol SY and the symbols SY1 to SY4 during the load handling work so as to reduce a likelihood of contact between the load 70 and the associated adjacent objects adjacent to the load 70. The symbol SY and the symbols SY1 to SY4 displayed on the monitor 56 allows the operator to be informed of the information about the values d1 to d4 of the respective clearances C1 to C4. The monitor 56 thus serves as an informing unit.

As illustrated in FIG. 2, the operation assisting apparatus 60 used for the remote operation system 10 of the load handling vehicle includes members informing the operator of the information about the values d1 to d4 of the respective clearances C1 to C4, such as the camera 41, the image processing unit 42, the vehicle-side wireless unit 43, the stereoscopic cameras 45 and 46, the second wireless unit 54, the display controller 55, and the monitor 56.

The following will describe operational functions of the embodiment of the present disclosure.

The image processing unit 42 derives the coordinates of the feature points in the coordinate systems in the real space based on differences between the two image data captured by the two cameras of the stereoscopic cameras 45 and 46. In other words, the stereoscopic cameras 45 and 46 allow the image processing unit 42 to perform a three-dimensional measurement. The image processing unit 42 is allowed to extract an object in each of the coordinate systems in the real space by clustering the feature points of the object as a group of points based on the coordinates of the feature points. Since each of the stereoscopic cameras 45 and 46 is disposed so that the load 70 is included in the associated imaging range, the image processing unit 42 is allowed to derive the load handling space 91 occupied by the load 70 in the associated coordinate system in the real space. Since the coordinate system in the real space is provided by three axes of the X-axis, the Y-axis, and the Z-axis that are orthogonal to one another, deriving the load handling space 91 in the coordinate system in the real space permits deriving a positional relation between the load handling space 91 and the object. The clearances C1 and C2 between the load handling space 91 and the associated adjacent objects adjacent to the load handling space 91 refer to the clearances between the load 70 carried on the load handling apparatus 24 and the associated adjacent objects adjacent to the load 70 in the Z-axis direction whereas the clearances C3 and C4 between the load handling space 91 and the associated adjacent objects adjacent to the load handling space 91 refer to the clearances between the load 70 carried on the load handling apparatus 24 and the associated adjacent objects adjacent to the load 70 in the X-axis direction. Therefore, by deriving the values of the clearances C1 to C4 between the load handling space 91 and the associated adjacent objects adjacent to the load handling space 91, whether or not the load 70 contacts any of the associated adjacent objects adjacent to the load 70 is determined.

The following will describe operational effects of the embodiment of the present disclosure.

(1) Under the control of the display controller 55, the symbol SY or any of the symbols SY1 to SY4 for informing the operator of whether or not any of the values of the associated clearances C1 to C4 is less than the threshold value is displayed as the information about the values of the clearances C1 to C4 between the load handling space 91 and the associated adjacent objects adjacent to the load handling space 91. The information about the values of the clearances C1 to C4 allows the operator to easily determine whether or not the load 70 contacts the associated adjacent objects adjacent to the load 70.

(2) Under the control of the display controller 55, the symbol SY or any of the symbols SY1 to SY4 is displayed superposingly on the captured image I on the monitor 56. The symbol SY and any of the symbols SY1 to SY4 serve as the information about the values of the associated clearances C1 to C4. The operator of the forklift truck 20 operates the forklift truck 20 while observing the captured image I displayed on the monitor 56. The symbol SY and the symbols SY1 to SY4 displayed on the monitor 56 allow the operator to easily identify the information about the values of the respective clearances C1 to C4.

(3) Under the control of the display controller 55, information informing the operator that any of the values of the clearances C1 to C4 is less than the threshold value is displayed as the information about the values of the associated clearances C1 to C4. This allows the operator to easily identify whether or not the load 70 contacts any of the adjacent objects adjacent to the load 70 as compared to a case where numerical values of the clearances C1 to C4 are directly displayed as the information about the values of the respective clearances C1 to C4.

The embodiment may be modified as follows. Components of the above-described embodiment and modification examples to be described below may be combined one another as long as they offers equivalent advantageous effects in essence to the scope of the disclosure.

The operation assisting apparatus 60 for the load handling vehicle may derive the clearances between the load handling space 91 and the associated adjacent objects adjacent to the load handling space 91 during the load picking up operation to inform the operator of the information about the values of the clearances. The load picking up operation is an operation to load the load 70 onto the forks 27. In other words, the load picking up operation is an operation in which the forks 27 inserted into holes of the pallet 72 are lifted so that the pallet 72 is supported by the forks 27. In the load picking up operation, the load 70 placed in the picking up location is being loaded onto the forks 27. During this operation, the load 70 placed in the picking up location may possibly contact some of the adjacent objects adjacent to the load 70. Also, depending on an installation angle of the camera 41 or surroundings of the picking up location, some of the clearances between the load 70 and the associated adjacent objects adjacent to the load 70 may be difficult to be viewed in the captured image I displayed on the monitor 56. Therefore, the operation assisting apparatus 60 may assist the operator with the load picking up operation by informing the operator of the information about the values of the clearances, as in the case of the load placing operation.

In the case where the clearances between the load handling space 91 and the associated adjacent objects adjacent to the load handling space 91 are derived for the load picking up operation, the load handling space 91 corresponds to the occupying space 92 occupied by the load 70 carried on the load handling apparatus 24. Since the values of the clearances between the load 70 placed in the load placing location and the associated adjacent objects adjacent to the load 70 are derived for the load picking up operation, the occupying space 92 need not be extended in the Y-axis direction. In the case where the occupying space 92 occupied by the load 70 carried on the load handling apparatus 24 is derived for the load picking up operation, the occupying space 92 is derivable by the image processing unit 42 when the forks 27 are inserted into the holes of the pallet 72. The occupying space 92 is derived in the same manner as the above-described embodiment. The image processing unit 42, after having derived the occupying space 92, derives the clearances between the occupying space 92 and the associated adjacent objects adjacent to the occupying space 92. The clearances between the occupying space 92 and the associated adjacent objects adjacent to the occupying space 92 may be derived from coordinates of the occupying space 92 and coordinates of the associated adjacent objects adjacent to the occupying space 92. Processing after derivation of the clearances between the occupying space 92 and the associated adjacent objects adjacent to the occupying space 92 is performed in the same manner as the above-described embodiment.

The operation assisting apparatus 60 for the load handling vehicle may derive the clearances between the load handling space 91 and the associated adjacent objects adjacent to the load handling space 91 only during the load picking up operation to inform the operator of the information about the values of the clearances. Alternatively, the operation assisting apparatus 60 for the load handling vehicle may derive the clearances between the load handling space 91 and the associated adjacent objects adjacent to the load handling space 91 only during the load placing operation to inform the operator of the information about the values of the clearances. Alternatively, the operation assisting apparatus 60 for the load handling vehicle may derive the clearances between the load handling space 91 and the associated adjacent objects adjacent to the load handling space 91 during both the load picking up operation and the load placing operation to inform the operator of the information about the values of the clearances. In other words, the operation assisting apparatus 60 for the load handling vehicle is allowable as long as the operation assisting apparatus 60 for the load handling vehicle derives the clearances between the load handling space 91 and the associated adjacent objects adjacent to the load handling space 91 during at least one of the load picking up operation and the load placing operation to inform the operator of the information about the values of the clearances.

The image processing unit 42 is allowable as far as the image processing unit 42 defines the adjacent object adjacent to the load handling space 91 as at least one of the adjacent object adjacent to the load handling space 91 in the X-axis direction and the adjacent object adjacent to the load handling space 91 in the Z-axis direction. The adjacent object may only be the adjacent object adjacent to the load handling space 91 in the X-axis direction. Alternatively, the adjacent object may only be the adjacent object adjacent to the load handling space 91 in the Z-axis direction. The adjacent object may only be the adjacent object adjacent to the load handling space 91 in the vertical direction. Alternatively, the adjacent object may only be the adjacent object adjacent to the load handling space 91 in the right-left direction. In other words, the image processing unit 42 may derive only the values of the clearances present above and below the load handling space 91. Alternatively, the image processing unit 42 may derive only the values of the clearances present to the right and to the left of the load handling space 91.

The operation assisting apparatus for the load handling vehicle may assist the driver of the forklift truck 20 as the operator. In this case, the monitor 56 is placed at a position visible from the driver of the forklift truck 20, i.e., from the driver seat. The display controller 55 is installed in the forklift truck 20 so as to display the information about the captured image I and the values of the clearances on site. Since the image data need not be sent to the remote operation device 50, the remote operation device 50, the vehicle-side wireless unit 43, and the wireless unit 44 may be excluded. In this case, the operation assisting apparatus for the load handling vehicle may include the camera 41, the image processing unit 42, the stereoscopic cameras 45 and 46, the monitor 56 installed in the forklift truck 20, and the display controller 55 under the control of which the information about the captured image I and the values of the clearances are displayed on the monitor 56.

As the display information informing the operator that any of the values of the clearances is less than the threshold value, text data may be used instead of the symbol SY and the symbols SY1 to SY4.

The information about the values of the clearances may be the numerical values of the clearances. In this case, any of the numerical values of the clearances is displayed superposingly on the captured image I under the control of the display controller 55, instead of the symbol SY and the symbols SY1 to SY4 according to the clearances. This allows the operator to determine whether or not the load 70 contacts any of the adjacent objects adjacent to the load 70.

The information about the value of the clearance may be information only about presence of a clearance having a value less than the threshold value. The information about the value of the clearance on which side of the load handling space 91 is less than the threshold value need not be identified and warned.

The informing unit may be any member as long as the member is capable of informing the operator of the information about the values of the clearances. For example, the informing unit may inform the operator of the information about the values of the clearances by a sound. In this case, the informing unit may be a sound producing member capable of sounding an alert. The sound producing member is activated when any of the values of the clearances between the load handling space 91 and the associated adjacent objects adjacent to the load handling space 91 is less than the threshold value. Alternatively, the informing unit may inform the operator of the information about the values of the clearances by a voice. In this case, the information about the value of the clearance on which side of the load handling space 91 is less than the threshold value may be informed by the voice. Alternatively, the informing unit may be a vibration member that informs the operator of the information about the values of the clearances by a vibration. The vibration member is activated when any of the values of the clearances between the load handling space 91 and the associated adjacent objects adjacent to the load handling space 91 is less than the threshold value.

The image processing unit 42 may wirelessly send the image data obtained from the stereoscopic cameras 45 and 46 in Step S1 to the remote operation device 50 so that the processing in Steps S2 and thereafter may be performed by the display controller 55. The image processing unit 42 may wirelessly send the parallax images obtained through the stereo image matching processing in Step S2 to the remote operation device 50 so that the processing in Steps S3 and thereafter may be performed by the display controller 55. The image processing unit 42 may wirelessly send the coordinates of the feature points derived in Step S3 to the remote operation device 50 so that the processing in Steps S4 and thereafter may be performed by the display controller 55. The image processing unit 42 may wirelessly send the coordinates of the objects extracted by clustering the feature points in Step S4 to the remote operation device 50 so that the processing in Steps S5 and thereafter may be performed by the display controller 55. The image processing unit 42 may wirelessly send the coordinates of the objects extracted by clustering the feature points in Step S4 and the position of the load 70 derived in Step S5 to the remote operation device 50 so that the processing in Steps S6 and thereafter may be performed by the display controller 55. The image processing unit 42 may wirelessly send the coordinates of the objects extracted by clustering the feature points in Step S4 and the position of the load handling space 91 derived in Step S6 to the remote operation device 50 so that the processing in Steps S7 and thereafter may be performed by the display controller 55. The image processing unit 42 may wirelessly send the values of the clearances derived in Step S7 to the remote operation device 50 so that the processing in Steps S8 and thereafter may be performed by the display controller 55. As described above, derivation of clearances based on the image data obtained from the stereoscopic cameras 45 and 46, the contact possibility determined based on the derived clearances, or the like may be performed either in the forklift truck 20 or the remote operation device 50.

An image processing unit configured to process the image data obtained from the camera 41 and an image processing unit configured to process the image data obtained from the stereoscopic cameras 45 and 46 may be individually provided.

The forklift truck 20 may include a single unit serving as both the main controller 31 and the image processing unit 42, instead of including the main controller 31 and the image processing unit 42 separately.

The remote operation device 50 may include a single unit serving as both the operation controller 52 and the display controller 55, instead of including the operation controller 52 and the display controller 55 separately.

The operation assisting apparatus for the load handling vehicle may be capable of assisting both the operator located in the operation chamber and the driver of the forklift truck 20. In this case, the monitor 56 is placed at a position visible from the driver of the forklift truck 20 in addition to the monitor 56 in the operation chamber. When the forklift truck 20 is operated by the driver, the information about the captured image I captured by the camera 41 and the values of the clearances are set to be displayed on the monitor 56 that is visible from the driver of the forklift truck 20. When the forklift truck 20 is operated by the operator located in the operation chamber, the information about the captured image I captured by the camera 41 and the values of the clearances are set to be displayed on the monitor 56 located in the operation chamber.

The image processing unit 42 may perform the processing with the origin of the coordinate system of the first stereoscopic camera 45 aligned with the origin of the coordinate system of the second stereoscopic camera 46. In this case, the coordinates of the feature points derived from the image data captured by the first stereoscopic camera 45 and the coordinates of the feature points derived from the image data captured by the second stereoscopic camera 46 may be merged to derive the values of the clearances between the load handling space 91 and the associated adjacent objects adjacent to the load handling space 91. This allows the values of the clearances between the load handling space 91 and the associated adjacent objects adjacent to the load handling space 91 to be derived in the single coordinate system in the real space.

The forklift truck 20 may be a driverless forklift truck. In other words, the forklift truck 20 may be a forklift truck that is exclusively operated by the remote operation device 50.

A three-dimensional camera may be used as the sensor, in addition to the stereoscopic cameras 45 and 46. The three-dimensional camera is a camera capable of measuring three dimensions of an object. Such a camera includes the stereoscopic cameras 45 and 46 and a time-of-flight camera. The sensor is allowable as far as the sensor is capable of measuring three dimensions of an object. Such a sensor may be a Laser Imaging, Detection and Ranging (LIDAR), and a millimeter wave radar. The LIDAR is a distance meter capable of measuring distances by radiating lasers in variable radiation angles and receiving lights reflected from surroundings so as to identify states of the surroundings. In a case where the LIDAR is used, the points representing parts of objects refer to portions of the surroundings from which the lasers are reflected. The millimeter wave radar is a sensor capable of radiating radio waves in a given frequency range to the surroundings so as to identify the states of the surroundings. In a case where the millimeter wave radar is used, the points representing parts of objects refer to portions of the surroundings which the radio waves reach. The points representing parts of objects refer to points with which the coordinates in the coordinate system in the real space are detectable by the sensor. The sensor may be a single unit in which multiple sensors such as the three-dimensional camera and the LIDAR are combined.

The stereoscopic camera may be a single unit. In this case, it is desirable that the entire load 70 is included in the imaging range of the stereoscopic camera so as to derive the load handling space 91. Also, in a case where the clearance in the X-axis direction need not be derived such as a case where the value of the clearances between the load handling space 91 and the associated adjacent objects adjacent to the load handling space 91 only in the Z-axis direction are derived, the stereoscopic camera may be a single unit.

The captured image I captured by the stereoscopic cameras 45 and 46 may be displayed on the monitor 56. In this case, the stereoscopic cameras 45 and 46 may be used both as the sensor for the three-dimensional measurement and as the camera for capturing the captured image I to be displayed on the monitor 56.

A position of the camera 41 or the number of the cameras 41 may be changed as appropriate.

A member other than the forks 27 may be used as the load handling member. The load handling member may be an attachment member such as a clamp and a ram mount item.

The object extraction unit, the load handling space derivation unit, and the clearance derivation unit each may be individual units.

The operation assisting apparatus for the load handling vehicle may assist an operator who operates a load handling vehicle other than the forklift truck 20, such as a crane truck.

REFERENCE SIGNS LIST

C1 to C4 clearance
d1 to d4 value
I captured image
20 forklift truck serving as load handling vehicle
24 load handling apparatus
41 camera
42 image processing unit serving as object extraction unit, load handling space derivation unit, and clearance derivation unit
45, 46 stereoscopic camera serving as sensor
55 display controller serving as display unit
56 monitor serving as informing unit
60 operation assisting apparatus for load handling vehicle
70 load
91 load handling space

The invention claimed is:

1. An operation assisting apparatus for a load handling vehicle that conveys a load carried on a load handling apparatus, comprising:

a sensor;

an object extraction unit configured to extract, as objects, a group of points representing parts of the objects from a result detected by the sensor in a coordinate system in a real space in which an axis extending in a width direction of the load handling vehicle among horizontal directions is an X-axis, an axis extending in an orthogonal direction to the X-axis among the horizontal directions is a Y-axis, and an axis extending in the vertical direction is a Z-axis;

a load handling space derivation unit configured to derive a load handling space that is occupied by the load during load handling work performed by the load handling apparatus, in the coordinate system in the real space;

a clearance derivation unit configured to derive a value of a clearance between the load handling space and an adjacent object adjacent to the load handling space, where the adjacent object is at least one of the objects adjacent to the load handling space in a direction along the X-axis and adjacent to the load handling space in a direction along the Z-axis, among the objects extracted by the object extraction unit; and an informing unit configured to inform an operator of the load handling vehicle of information about the value of the clearance.

2. The operation assisting apparatus for the load handling vehicle according to claim 1, wherein the informing unit is a monitor that is placed at a position visible from the operator of the load handling vehicle and on which a captured image captured by a camera installed in the load handling vehicle is displayed, and the operation assisting apparatus includes a display unit configured to display the information about the value of the clearance superposed on the captured image.

3. The operation assisting apparatus for the load handling vehicle according to claim 1, wherein the informing unit is configured to inform the operator of whether the value of the clearance is less than a predetermined threshold value.

4. The operation assisting apparatus for the load handling vehicle according to claim 2, wherein the informing unit is configured to inform the operator of whether the value of the clearance is less than a predetermined threshold value.

* * * * *